United States Patent
Etemad et al.

[11] Patent Number: 6,155,819
[45] Date of Patent: Dec. 5, 2000

[54] DRY, LOW NO$_X$ CATALYTIC PILOT

[75] Inventors: Shahrokh Etemad, Trumbull; Lance L. Smith, North Haven; Hasan Ul Karim, Hamden, all of Conn.; Gregory Scott Jackson, Greenbelt, Md.; William C. Pfefferle, Madison, Conn.

[73] Assignee: Precision Combustion, Inc., New Haven, Conn.

[21] Appl. No.: 09/097,175

[22] Filed: Jun. 12, 1998

[51] Int. Cl.[7] ................................................. F23D 11/44
[52] U.S. Cl. ................................. 431/228; 431/8; 431/9; 431/11; 431/115; 431/247; 431/268; 60/723; 60/736; 60/738
[58] Field of Search .................................. 431/228, 7, 9, 431/11, 115, 116, 247, 248, 268, 8; 60/736, 738, 723, 737, 749

[56] References Cited

U.S. PATENT DOCUMENTS

| | | |
|---|---|---|
| 3,417,978 | 12/1968 | Suzukawa et al. .................. 431/7 |
| 3,430,443 | 3/1969 | Richardson et al. ................ 60/738 |
| 3,626,444 | 12/1971 | Caruel .................................. 431/248 |
| 4,000,978 | 1/1977 | Henrie ................................. 431/116 |
| 4,040,252 | 8/1977 | Mosier et al. ........................ 60/723 |
| 4,262,482 | 4/1981 | Roffe et al. .......................... 431/247 |
| 5,405,260 | 4/1995 | Della Betta et al. ................. 431/7 |
| 5,452,574 | 9/1995 | Cowell et al. ....................... 60/723 |
| 5,623,819 | 4/1997 | Bowker et al. ....................... 60/723 |
| 5,626,017 | 5/1997 | Sattelmayer ......................... 60/723 |
| 5,634,784 | 6/1997 | Pfefferle et al. ..................... 431/7 |
| 5,759,024 | 6/1998 | Robinson ............................. 431/228 |

*Primary Examiner*—Ira S. Lazarus
*Assistant Examiner*—Josiah C Cocks
*Attorney, Agent, or Firm*—McCormick, Paulding & Huber LLP

[57] ABSTRACT

This invention relates to an apparatus and method for increasing the reactivity of a fuel/air mixture prior to homogenous combustion of the mixture. More specifically, this invention is a pilot for a gas turbine combustor which utilizes the heat of combustion within the pilot to increase the reactivity of a portion of the fuel/air mixture utilized by the pilot.

19 Claims, 2 Drawing Sheets

DRY, LOW NO$_X$ CATALYTIC PILOT

BACKGROUND OF THE INVENTION

1. Field of the Invention

This invention relates to an apparatus and method for increasing the reactivity of a fuel/air mixture prior to homogenous combustion of the mixture. More specifically, the present invention is a pilot for a gas turbine combustor which utilizes the heat of combustion within the pilot to increase the reactivity of a portion of the fuel/air mixture utilized by the pilot.

2. Brief Description of the Related Art

Known dry low NOx combustion systems for gas turbines can achieve relatively low emissions levels; however, the use of continuous pilot systems, as distinguished from starter systems, is required to stabilize combustion over a wide range of gas turbine operational conditions and minimize emission levels.

U.S. Pat. No. 5,634,784 represents a state-of-the-art continuous pilot. The patent teaches a catalytic pilot that will make a portion of the fuel/air mixture destined for the pilot's combustion zone more reactive by passing it through a catalytic centerbody. The patent also teaches that by recirculating hot combustion gas products back on to the catalytic centerbody the catalytic centerbody can use the heat of combustion within the pilot to assure that the catalytic component of the centerbody is at a suitably high operating temperature.

The structure of the catalytic centerbody design previously taught has several shortcomings. In particular, no method is provided to limit the temperature of the centerbody, thus the surface temperature could reach the adiabatic flame temperature of the fuel/air mixture, generally above the centerbody's material failure temperature. In addition, the short channel design of the catalyst limits the residence time thus the catalytic reaction of the centerbody fuel/air mixture, which is a critical factor in assuring flame stability within the pilot.

It has now been found that by utilizing the fuel/air mixture passing through the centerbody more fully, a more versatile pilot can be created. The invention accomplishes this by increasing the channel length for the fuel/air mixture within the centerbody. In addition, the fuel/air mixture entering the centerbody is given the function of cooling the centerbody structure, increasing the temperature and overall combustibility of the fuel/air mixture, and allowing the centerbody to be exposed to greater temperatures, even temperatures above the material limit of the centerbody. The improved centerbody can be used to either impart a thermal rise to the fuel/air mixture, a degree of catalytic pre-reaction, or a combination of both.

SUMMARY OF THE INVENTION

The Dry, Low NOx Catalytic Pilot (hereinafter "pilot") is a continuously operating pilot that stabilizes the combustion within a gas turbine combustor. The basic pilot utilizes two fuel/air flows. One fuel/air flow enters a centerbody which is placed within a well, and by passing through the centerbody and out the well obtains a temperature rise by extracting heat from the centerbody. The second fuel/air flow passes through a flow conditioner capable of creating a recirculation zone to provide heat to the centerbody.

The centerbody, well, and flow conditioner are parts of an integrated assembly. In the pilot of the present invention, the combustion zone is maintained downstream of the centerbody. The flow conditioner has the dual functions of contacting the second fuel/air mixture with heated fuel/air exiting the well, and creating a recirculation zone such that hot combustion gases, either through radiation or conduction, impart a temperature rise to the centerbody. The flow conditioner can be any structure capable of accomplishing these functions, such as a swirler, a bluff body, a dump, opposed flow jets, or a combination of any of the above.

The centerbody is at least partially recessed within a well in the flow conditioner, or within a well in a hub or other structure attached to the flow conditioner. During operation, a portion of the centerbody is simultaneously exposed to the heat of the recirculation zone on one surface and the fuel/air mixture entering the centerbody on an opposite surface (or backside). The entering fuel/air mixture sufficiently interacts with this opposite surface to obtain a temperature rise thereby lowering the temperature of the centerbody. This backside cooling of the centerbody can allow the temperature of the recirculation gases to exceed the material limit of the centerbody. Backside cooling allows for an increased temperature rise to be imparted to the fuel/air mixture; as the temperature of the recirculation gases contacting the centerbody are increased the temperature rise imparted to the fuel/air mixture is increased for any given flow.

The centerbody comprises a cap, and a fuel/air channel. The cap is placed over the fuel/air channel exit such that the fuel/air mixture enters the space between the cap and the fuel/air channel at a point above the centerbody exit (entrance to the well), forcing the fuel/air mixture to be turned by, and to interact with, the cap. The term "above" refers to a direction parallel to (and in the same direction as) the flow of the fuel/air mixture in the fuel/air channel. For the present invention three structures, which should not be considered limiting, have been identified for integrating the cap and fuel/air channel to create the centerbody. The first structure is the mounting of the cap to the fuel/air channel between the exit point of the fuel/air channel and above the base of the cap. This is accomplished by using securing means such as pins, screws, rods, bolts or perforated plates. In the event that the cap is mounted close to the base of the well the exit points from the cap may be through the side of the cap. In the event the cap is mounted tight to the hub or flow conditioner, cap exits other than the opening in the bottom of the cap will usually be required. The second method is to secure the base of the cap directly to the fuel/air channel. This involves providing a cap exit or exits below the exit of the fuel/air channel above the attachment point. The third method is to secure the cap and fuel/air channel separately to the hub or flow conditioner, to form a complete assembly. In this case, cap exits will usually be provided above the mounting point, or the mounting means will allow passage of the fuel/air mixture through the well. The cap can be of numerous three dimensional configurations, such as cylindrical or elliptical; symmetry is not required.

The cap should have a high thermal conductivity. Preferably, the thermal conductivity of the cap should allow for a uniform distribution of the heat imparted to the cap from the recirculating gases so the temperature of the cap is approximately uniform.

The cap is positioned within the well such that the fuel/air mixture exiting the centerbody is below the top of the well and some portion of the cap is heated bit the recirculating combustion gases, either by conduction or radiation.

For the present invention two fuel/air mixture flows are required—a fuel/air mixture flow through the flow conditioner and a fuel/air mixture flow through the centerbody. The fuel/air mixture can either be a single flow split between the flow conditioner and the centerbody based on the flow characteristics of both, or separate fuel/air flows with different characteristics. If separate fuel/air flows are provided, flow conditions could vary significantly, such as different fuel/air mixture ratios (even to the degree that one is rich and the other lean), different flow velocities, or different fuels. It is also possible to split a single fuel/air mixture but provide additional fuel injection to one or both of the two resulting fuel/air streams, thereby varying flow conditions, fuel/air mixture ratios, or fuel composition. These design alternatives can be done by those skilled in the art.

A catalytic variant of the present invention is also possible. In the catalytic variant, a catalyst is deposited on a selected portion or all of the surfaces of the cap of the centerbody. By controlling the placement of the centerbody in the well and the spacing between the well wall and the centerbody, it is possible to control the residence time and mass transfer to the catalyst surface. By also controlling the catalyst activity (catalyst reactivity and surface coverage) the degree of catalytic pre-reaction imparted to the fuel/air mixture that exits the centerbody can be varied. In the catalytic variant, the fuel/air mixture traveling through the centerbody may obtain a temperature rise due to a catalytic reaction and can also incorporate the thermal heat transfer mechanism discussed above for the basic invention.

In addition, as the centerbody is placed within the pilot in such a way as to have the cap of the centerbody heated by the reaction gases, it is possible to use the catalyst deposited in this region to stabilize combustion within the pilot and heat the centerbody.

Since catalysts are employed for two distinct functions, several catalysts of different compositions could be used in the catalytic variant of the present invention. For example, the catalyst deposited on the surfaces of the cap being heated directly by the recirculating gases could be designed to directly support the combustion within the pilot and provide an exothermic reaction to heat the centerbody. A different catalyst might be used to provide catalytic pre-reaction of the fuel/air mixture traveling through the centerbody.

While the present invention contemplates that catalyst can be applied to selected surfaces of the centerbody, the backside (opposite side) of the surfaces exposed to the recirculating gases must not be coated with an active catalyst, so that the exposed surfaces of the centerbody cap are always backside cooled by the fuel/air mixture entering the centerbody.

DETAILED DESCRIPTION OF THE PREFERRED EMBODIMENTS

Figure 1A:
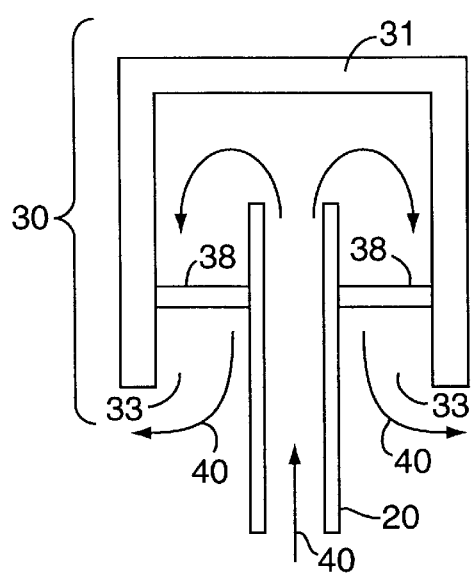
FIGS. 1A and 1B are a cross-section of a centerbody with an open cap.
Figure 1B:
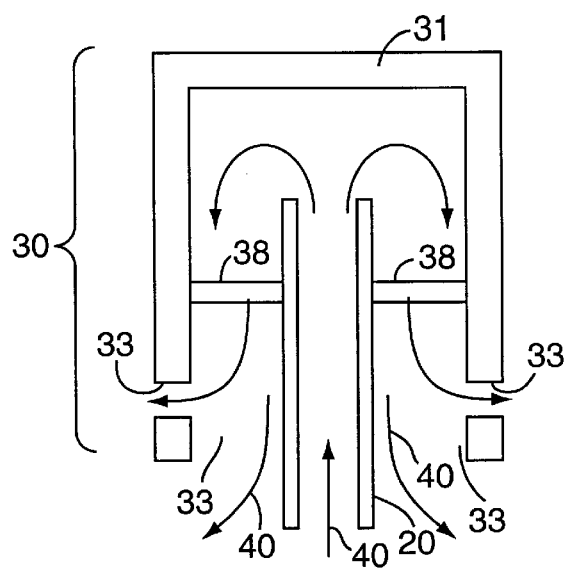

FIG. 1A depicts an open cap centerbody 30 which is comprised of a cap 31, a fuel/air channel 20, and mounting pins 38. The cap 31 is placed adjacent to fuel/air channel 20 such that a path is created for the fuel/air mixture 40 that enters the centerbody 30 through fuel/air channel 20. As shown in FIG. 1A, cap 31 is a hollowed cylinder with exit 33. As shown in FIG. 1B, in the event the bottom of the cap is partially or totally blocked when the centerbody is installed in a pilot, additional exits 33, 33 could be or would have to be provided. It is also possible to use a combination of these exit strategies. The cap is placed approximately concentrically over the fuel/air channel 20. The sides of cap 31 extend to a point below the exit of fuel/air channel 20. The term "below" refers to a direction opposite the flow direction of the fuel/air mixture in the fuel/air channel 20. The mounting pins 38 secure the cap 31 to the fuel/air channel 20.

Figure 2:
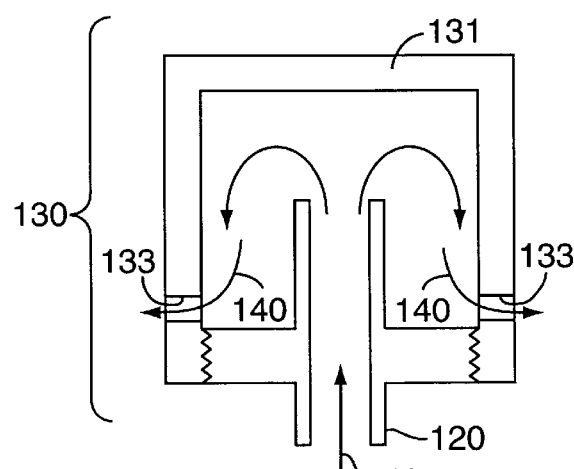
FIG. 2 is a cross-section of a centerbody with a closed cap.

FIG. 2 depicts a closed cap centerbody 130 which is comprised of a cap 131 and fuel/air channel 120. The fuel/air channel 120 has an expanded area capable of allowing the cap 131 to be affixed thereto. Cap 131 can be affixed using any scheme of mechanical or fused methods or combination thereof suitable for the application, such as pins, screws, rivets, bolts, threads, welding, brazing, soldering, or gluing. Fuel/air mixture 140 exits the cap through exit or exits 133. Any number of exits can be provided as long as all the exits are below the fuel/air channel exit.

FIGS. 1 and 2 illustrate a concentric relationship between the fuel/air channel 20 and 120, and cap 31 and 131, respectively. The shape of the cap 31 and 131 are based upon the design requirements of the centerbody, and FIGS. 1 and 2 should be considered illustrative rather than limiting.

Channeling structures, including grooves, ribs, pins, dimples, or other surface treatments for increased heat transfer to the fuel/air mixture can be incorporated into the cap. Channeling structures are structures cantilevered from cap 31 or 131, providing additional heat transfer surfaces. Channeling structures can be located on any surface of the cap.

Figure 3:
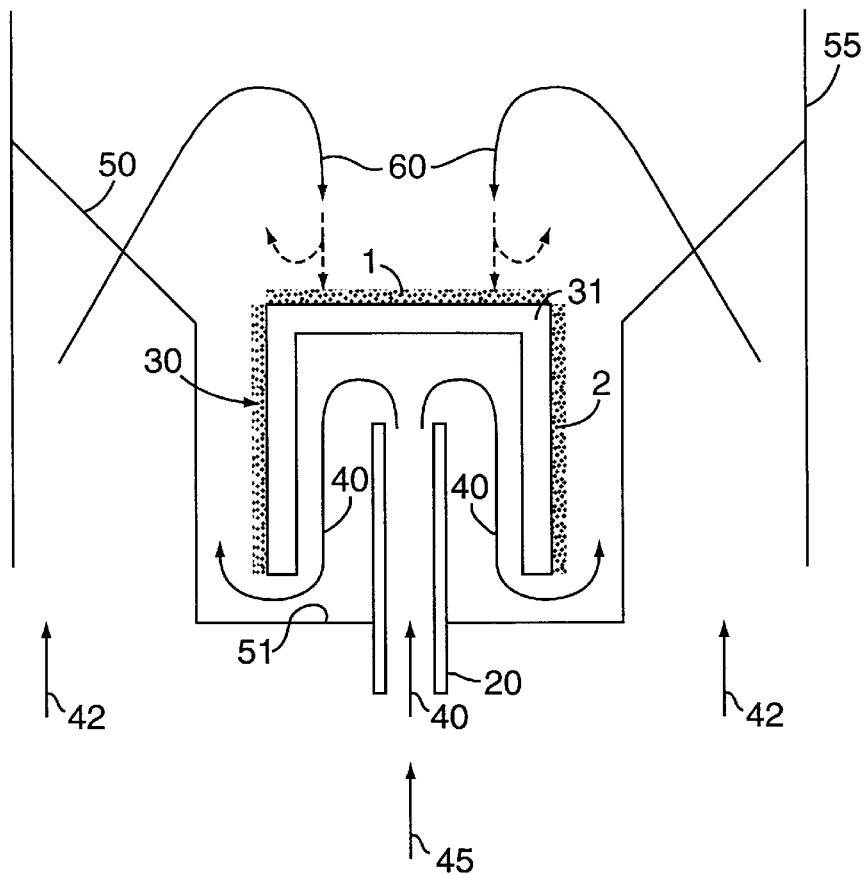
FIG. 3 is a cross-section of the pilot using an open cap centerbody and a swirler as a flow conditioner.

FIG. 3 is a pilot employing a pilot wall 55, an open cap centerbody 30, a well 51 and a swirler 50, as the flow conditioner structure. Swirler 50 is mounted approximately concentrically within the pilot wall 55, and a centerbody 30 is mounted approximately concentrically within well 51 which is mounted approximately concentrically within swirler 50. It should be noted that the exit of centerbody 30 created by cap 31 is below the exit of well 51. The pilot wall 55 confines a single fuel/air mixture 45 which is forced by pressure into the swirler 50 and the centerbody 30, forming fuel/air mixtures 40 and 42 respectively.

Swirler 50 is selected such that the swirl of swirler 50 will cause a recirculation zone to form sufficient to cause the recirculating combustion gases to contact cap 31, throughout a significant portion of the operating range of the pilot.

To create a proper recirculation zone, swirler 50 must cause vortex breakdown within the swirl zone sufficient to cause flow reversal and backmixing. Generally, a swirl number greater than 0.5 is required to achieve this result. For this invention, the swirl number is defined as the quotient which results when tangential momentum flux is divided by the product of swirler radius and axial momentum flux. Tangential momentum flux is defined as the product of density, axial velocity, tangential velocity, radius, and flow area. Axial momentum flux is defined as the product of the density, the square of axial velocity, and the flow area. The combination of a dump (sudden expansion in flow area) and swirl is particularly effective in creating a strong recirculation zone, especially at low swirl number (order of magnitude 0.5). In a preferred embodiment of the present invention, a dump is located downstream of the swirler to assist in stabilizing combustion and providing strong recirculation of hot combustion gases to contact the pilot centerbody.

The placement of cap 31 within the centerbody 30 relative to well 51 and within swirler 50 is based on the characteristics of the recirculation zone created by swirler 50. Those skilled in the art will recognize that the strength and position of the recirculation created by swirler 50 will change over the operating range of the pilot. In the present invention, it is preferred that the recirculation created by swirler 50 be created in such a fashion that for a majority of the operating conditions of the pilot the recirculating gases 60 contact the exposed portion of the top of cap 31, thereby causing direct conduction heating of the cap 31. Cap 31 is not required to project beyond the downstream end of well 51, but cap 31 may project beyond the downstream end of well 51. While direct conduction heating of cap 31 has been described, the present invention is not limited in this regard.

As the fuel/air mixture 45 enters the pilot the fuel/air mixture flow is split naturally between the centerbody 30 and the swirler 50. The minimum fuel/air flow entering the fuel/air channel 20 is based upon the fuel/air mixture flow required to stabilize the combustion zone and provide cooling of the cap 31, in the area where the cap is being heated by the recirculating gases 60. Those skilled in the art will appreciate that the backside cooling provided by the fuel/air mixture flow exiting fuel/air channel 20 maintains the temperature of cap 31 at an appropriate operating temperature, based upon the materials used to construct cap 31. The fuel/air mixture 40 flow should be no less than approximately 1% of the total fuel/air mixture 45 flow and should not exceed approximately 25%. A preferred range is between 3% and 10%.

The required degree of interaction between the fuel/air mixture exiting the fuel/air channel and the backside surface of the cap is determined by the desired temperature rise in fuel/air mixture 40; a temperature rise of the fuel/air mixture 40 is preferably at least 25 degrees Celsius. Allowable residence time is limited by either the auto-ignition delay time of the fuel/air mixture 40, or the requirement for maintaining sufficient velocity within the passage to prevent flashback of the flame. A nominal residence time is approximately 1 msec, but it could range from 0.1 to 10 msec.

Figure 4:
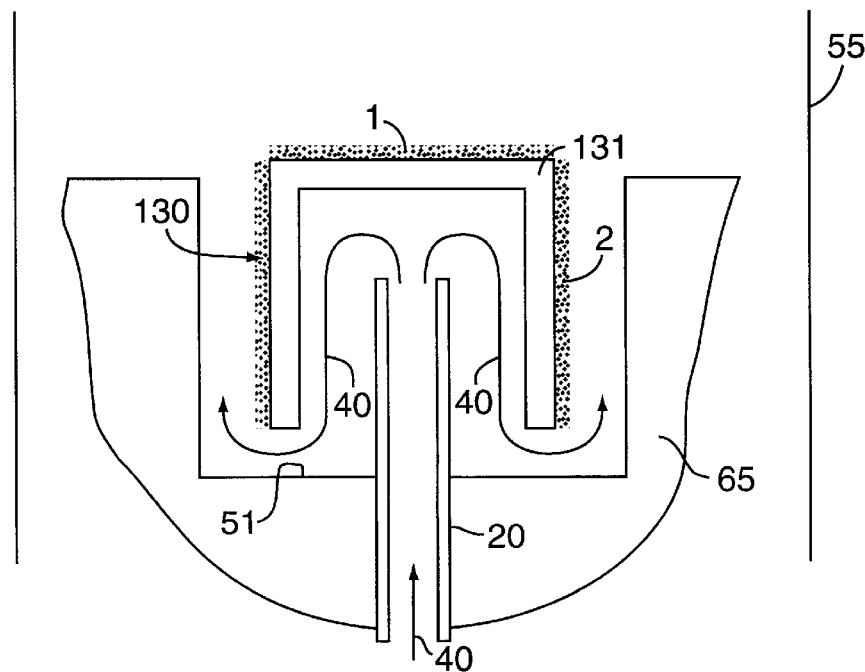
FIG. 4 is a cross-section of a pilot using an open cap centerbody and a bluff body as a flow conditioner.

FIG. 4 is a pilot employing an open cap centerbody and a bluff body 65 as the flow conditioner. Note that the exit of well 51 and the exit of centerbody 130 have the same relationship as described above.

As illustrated in FIGS. 3 and 4, the caps 31 and 131, respectively, can be coated with catalyst. In the preferred embodiment the recirculation gases 60 only impinge on the top of the cap, therefore if more than one catalyst is used the top of the cap is one region and the sides of the cap are a second region. The boundary of these regions will change to coincide with the boundary created by the recirculation gases 60.

In general, the extent of the catalyst coating applied is a function of the conversion desired, and is based on such factors as residence time and catalyst composition. FIGS. 3 and 4 illustrate the application of first catalyst 1 onto cap 31 and 131 on the surface of cap 31 directly exposed to the recirculation products 60. FIGS. 3 and 4 further illustrate using a second catalyst 2 applied to the cap on the outside surface of cap 31 and 131 away from the area being heated by the recirculating flow 60. In FIGS. 3 and 4, the applications of first catalyst 1 and second catalyst 2 are such that both catalysts are backside cooled by the fuel/air mixture exiting the fuel/air channel. While not shown, a catalyst could be added to the inside of the cap. In the event of a catalyst application in this area, it is critical that the backside cooling by fuel/air mixture 40 be retained. For this case, the rate of mass transfer to the catalyst surface should exceed the rate of chemical reaction on the surface, to maintain a kinetically controlled reaction at catalyst surface temperatures below the adiabatic flame temperature of the fuel/air mixture. For the present invention where methane is the fuel, the first and second catalyst would employ at least one Group VIII element as the core catalyst.

First catalyst 1 can be the same composition as second catalyst 2 or different depending upon the specific design requirements. The requirements for a first catalyst 1 are based on the dual requirements of supporting stabilization of the combustion within the pilot and the need for heating cap 31 above the temperature it would reach due to heat transfer from the recirculating gases 60. This additional heating requirement is generally to support catalytic conversion by second catalyst 2 within the path created between the centerbody and the well. In the present embodiment of the invention first catalyst 1 is of the same composition as second catalyst 2.

The first and second catalyst, 1 and 2 respectively, are formulated to meet the requirements of the pilot. Catalysts containing palladium or platinum are preferred when the fuel/air mixture 40 is a hydrocarbon. The primary difference to be accounted for in the formulations of the two catalysts is that the first catalyst 1 must be capable of withstanding a higher temperature, in the preferred embodiment up to approximately 1000 degrees C., due to the exposure of the first catalyst 1 to the recirculating gases. When a first catalyst 1 is used, cap 31 should reach a temperature of approximately 50 to 500 degrees Celsius above the temperature of the fuel/air mixture 40.

The materials used for the pilot must be suitable for the temperatures that will be encountered. In the preferred embodiment HASTALLOY Alloy X (UNS N06002) was used, but the precise material selection is based on the application.

What is claimed is:

1. A pilot for a gas turbine combustor comprising:
   a pilot wall defining a first interior area,
   a flow conditioner, said flow conditioner coupled to said pilot wall at a first end, and said flow conditioner having a well, defining well exit means,
   a centerbody, said centerbody comprising
   a fuel/air channel with an entrance and an exit, a cap defining exit means positioned below said well exit means, and means for securing said cap over said fuel/air channel, and said centerbody positioned in said well with said fuel/air channel penetrating the bottom of said well, and
   means for defining a flow path from said fuel/air channel exit past said cap through said well into said first interior area, said fuel/air channel exit positioned in said cap above said cap exit means.

2. The pilot of claim 1 wherein said flow conditioner is a swirler.

3. The pilot of claim 2 further comprising a catalyst deposited on said cap.

4. The pilot of claim 2 further comprising a second catalyst deposited on an outer surface defined by said cap in a region not contacted by recirculating gas, the recirculation of which being caused by said swirler.

5. The pilot of claim 4 further comprising a first catalyst, said first catalyst deposited on the outer surface of said cap in a region of said cap directly contacted and heated by said recirculation gas.

6. The pilot of claim 3 wherein said catalyst is comprised of an element of Group VIII.

7. The pilot of claim 5 wherein said first catalyst is comprised of an element of Group VIII and said second catalyst is from Group VIII.

8. The pilot of claim 1 wherein said flow conditioner is a bluff body.

9. The pilot of claim 8 further comprising a catalyst deposited on said cap.

10. The pilot of claim 8 further comprising a second catalyst, said second catalyst deposited on the outer surface of said cap in the region not contacted by recirculating gas.

11. The pilot of claim 10 further comprising a first catalyst, said first catalyst deposited on the outer surface of said cap in the region of said cap in directly heated by said recirculating gas.

12. The pilot of claim 9 wherein said catalyst is comprised of an element of Group VIII.

13. The pilot of claim 11 wherein said first catalyst is comprised of an element of Group VIII and said second catalyst is from Group VIII.

14. A method for stabilizing homogenous combustion within a pilot comprising:

passing a first fuel/air mixture through a centerbody, said centerbody comprising;

a fuel/air channel with an entrance and an exit, a cap with at least one exit, said fuel/air channel exit positioned in said cap above said cap opening, said centerbody positioned in a well with said fuel/air channel penetrating the bottom of said well, passing a second fuel/air mixture through a flow conditioner, said flow conditioner capable of mixing said first and second fuel/air mixture and forming a recirculation zone, creating a third fuel/air mixture by mixing said first fuel/air mixture with said second fuel/air mixture, combusting said third fuel/air mixture, and passing hot combustion gases back onto said centerbody using said recirculation zone.

15. The method of claim 14 wherein said cap has a catalyst deposit thereon.

16. The method of claim 14 wherein said catalyst is comprised of an element from Group VIII.

17. The method of claim 14 wherein said flow conditioner is a swirler.

18. The method of claim 16 further comprising passing said third fuel/air mixture though a dump, said dump located downstream of said flow conditioner, said dump positioned to assist in creating said recirculation zone.

19. The method of claim 14 wherein said flow conditioner is a bluff body.

\* \* \* \* \*